Figure 1:
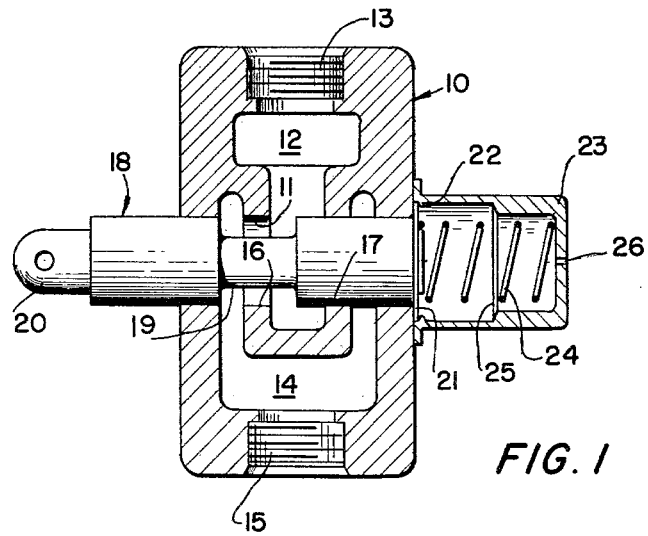

April 27, 1965  C. J. WORTH  3,180,361
CONTROL VALVE
Filed June 27, 1963

INVENTOR.
CHARLES J. WORTH
BY Charles J Worth
AGENT

United States Patent Office 3,180,361
Patented Apr. 27, 1965

3,180,361
CONTROL VALVE
Charles J. Worth, Bergenfield, N.J., assignor to Ingersoll-Rand Company, New York, N.Y., a corporation of New Jersey
Filed June 27, 1963, Ser. No. 290,986
6 Claims. (Cl. 137—625.37)

This invention relates to valves for controlling flow of pressure fluid, and more particularly to a valve that is normally closed during operation and progressively opens in response to progressively increasing force or fully opens when such force suddenly drops during normal operation.

The present valve is particularly adapted to compressor or pump by-pass or feed back lines in which the pressure and/or temperature provides a pilot pressure or force signal to an actuator for operating the novel valve. Present valves provide means by one spool for flow control and require a second spool to open the valve should the pilot pressure fail.

Accordingly, an object of this invention is to provide a pressure fluid flow control valve that is relatively inexpensive to manufacture and is of simple and rugged construction.

Another object of this invention is to provide a fluid flow control valve that is closed to block flow in response to a normal operation pilot signal which progressively opens the valve as it progressively increases beyond its normal operating range.

And another object of this invention is to provide the aforementioned valve which fully opens automatically when the pilot signal fails.

This invention contemplates a valve having a housing with a plunger bore, an inlet chamber to receive pressure fluid intersecting the bore, and a bifurcated outlet chamber intersecting the bore on both sides of the inlet chamber and forming a pair of spaced control lands in such bore; a plunger slidable in the bore between two terminal positions and having a flow path that laps one of the control lands in each terminal position to connect the inlet and outlet chambers to each other; the plunger having a normal operating position intermediate the terminal positions in which the control lands block the ends of the plunger flow path to block fluid flow from the inlet to the outlet chamber; a cap fixed to the housing covering one end of the plunger bore; spring means disposed in the cap engaging the end of the plunger and biasing the plunger to one of its terminal positions; and detent means disposed in the end of the plunger acting on said cap for holding the plunger with the spring in its spring biased terminal position until actuating force acting on the plunger reaches a predetermined normal operating valve.

The foregoing and other objects and advantages will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

Figure 1A:
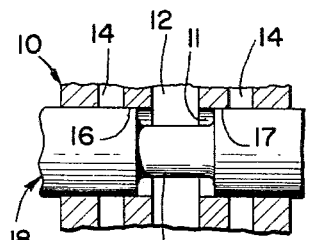
Figure 1B:
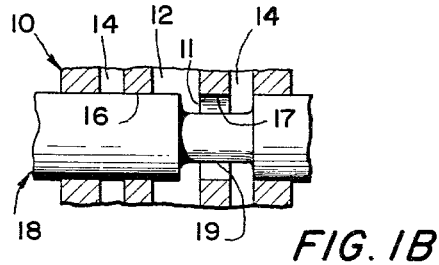
Figure 2:
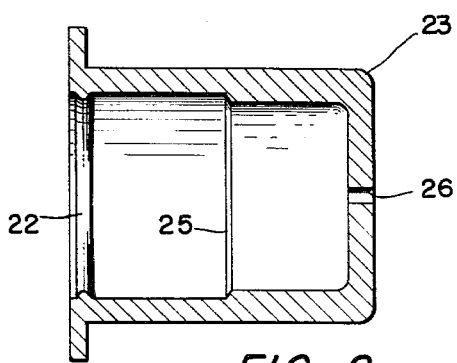
Figure 3:
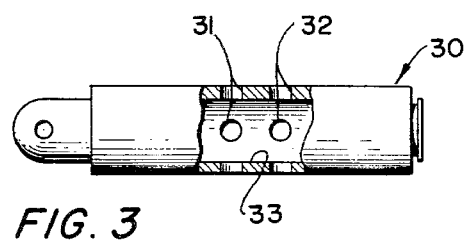

FIGURE 1 is a sectional view of a valve made in accordance with the present invention having its valve plunger in a terminal position, FIGURES 1A and 1B are sectional views of a portion of the novel valve of FIGURE 1 illustrating the plunger in its normal operation which is closed, and its other terminal positions respectively, FIGURE 2 is an enlarged sectional view of the cap of the novel valve, and FIGURE 3 is an elevational view of a modified valve plunger with a portion broken away to show its flow path.

Referring now to the drawings, a valve made in accordance with the present invention has a valve housing or body 10 with a through plunger bore 11. An inlet chamber 12 disposed in the body 10 intersects bore 11 and has an inlet port 13 to receive pressure fluid. An outlet chamber 14 disposed in the body 10 is bifurcated and intersects bore 11 on each side of inlet chamber 12 forming a pair of spaced flow control lands 16 and 17. Outlet chamber 14 has a port 15 for discharging pressure fluid.

A valve plunger 18 is slidable in bore 11 and has a necked down portion 19 which laps one of the lands 16 or 17 in each of its terminal positions to provide a flow path between the inlet chamber 12 to the outlet chamber 14, as shown in FIGURES 1 and 1B. In the normal operation, intermediate position as shown in FIGURE 1A, lands 16 and 17 cooperate with plunger 18 to close the ends of the flow path formed by necked down portion 19 to close the valve and block flow from inlet chamber 12 to outlet chamber 14. A fitting 20 is fixed at one end of plunger 18 for connection to an actuator (not shown) and the other end of plunger 18 has an annular groove to seat a split ring 21.

A cap 23 is connected to valve body 10 being axially alined with and covering the end of bore 11 at the end of plunger 18 that supports split ring 21. Cap 23 has a blind bore that is counterbored to form a stop 25 spaced from the body 10, when the valve is assembled, which limits axial displacement of ring 21 and the connected valve plunger 18. The end of cap 23 has a bleed port 26 to prevent buildup of pressure therein.

The cap 23 has an abutment 22 which may preferably be, as shown, an annular lip extending inwardly from the counterbore and spaced from the outer end thereof. The outer periphery of split ring 21 coacts with lip 22 to form a detent lock to hold plunger 18 in its terminal position as shown in FIGURE 1. Split ring 21 also provides a seat for a spring 24 housed in cap 23 which biases plunger 18 to its detented terminal position.

In operation, with no actuating force plunger 18 is in position as shown in FIGURE 1 wherein spring 24 urges split ring 21 into its detented position abutting valve body 10. Pressure fluid entering chamber 12 through port 13 flows between control land 16 and necked down portion 19 to outlet chamber 14 from whence it is discharged through port 15.

When the system (not shown) becomes operational, normal operating force will move plunger 18 against the force of spring 24, causing ring 21 to ride over lip 22, to its normal closed position. If normal operating pressures rise, increasing force acting on plunger 18 moves it against spring 24 to open the flow path between control land 17 and necked down portion 19 an amount dependent on the over-normal force. If the signal force for actuating plunger 18 fails or the system is shut down, spring 24 will bias the plunger with little or no resistance until split ring 21 rides over lip 22 and abuts valve body 10.

A modified valve plunger 30 is shown in FIGURE 3. Plunger 30 is of the hollow spool type having a bore 33 closed at its ends. Two spaced annular series of ports 31 and 32 communicate with bore 33 and correspond to the necked down portion 19.

Although two embodiments of the invention have been illustrated and described in detail, it is to be expressly understood that the invention is not limited thereto. Various changes may be made in the design and arrangement of the parts without departing from the spirit and scope of the invention as the same will now be understood by those skilled in the art.

I claim:
1. A flow control valve comprising:
    (a) a valve body having a plunger bore therethrough, an inlet chamber adapted to receive pressure fluid intersecting the bore, and a bifurcated outlet chamber to discharge pressure fluid intersecting the bore on each side of the inlet chamber and with the inlet chamber forming a pair of spaced control lands;
(b) a valve plunger slidable in the bore between two terminal positions and having flow path means lapping one of the control lands in each terminal position to open the valve to flow therethrough by connecting the inlet and outlet chambers;
(c) a cap connected to the valve body axially alined with the plunger bore;
(d) spring means disposed in the cap biasing the valve plunger to one of the terminal positions;
(e) detent means in the cap for holding the valve plunger in its spring biased terminal position until a predetermined normal operating force is exerted on the plunger against the bias of the spring; and
(f) the valve plunger having a valve closed position, in response to normal operating force exerted thereon, intermediate the terminal positions wherein the spaced lands lap the ends of the flow path to block flow from the inlet chamber to the outlet chamber.

2. The flow control valve in accordance with claim 1, and;
(a) the valve plunger having a fitting at one end adapted to be connected to valve operating means and an annular groove in the other end adjacent the cap; and
(b) a ring member disposed in the annular groove to provide a seat for the spring.

3. The flow control valve in accordance with claim 2, and;
(a) the cap having an inwardly extending abutment spaced from its ends; and
(b) the ring member extending radially outwardly past the plunger bore and being movable axially with the valve plunger between the valve body and the abutment to limit the axial movement of the valve plunger.

4. The flow control valve in accordance with claim 3, and;
(a) the cap having an inwardly disposed lip spaced from its end connected to the valve body to provide an indent; and
(b) the ring member being a split ring type spring providing a detent to seat in the indent to hold the valve plunger in its spring biased terminal position.

5. A flow control valve comprsing;
(a) a valve body having a plunger bore therethrough, an inlet chamber adapted to receive pressure fluid intersecting the bore, and a bifurcated outlet chamber to discharge pressure fluid intersecting the bore on each side of the inlet chamber and with the inlet chamber forming a pair of spaced control lands;
(b) a valve plunger slidable in the bore between two terminal positions and having an annular necked-down portion to provide a flow path means lapping one of the control lands in each terminal position to open the valve to flow therethrough by connecting the inlet and outlet chambers;
(c) a cap connected to the valve body axially alined with the plunger bore;
(d) spring means disposed in the cap biasing the valve plunger to one of the treminal positions;
(e) detent means in the cap for holding the valve plunger in its spring biased terminal position until a predetermined normal operating force is exerted on the plunger against the bias of the spring; and
(f) the valve plunger having a valve closed position, in response to normal operating force exerted thereon, intermediate the terminal positions wherein the spaced lands lap the ends of the necked-down portion to block the flow path means between the inlet and outlet chambers.

6. A flow control valve comprising;
(a) a valve body having a plunger bore therethrough, an inlet chamber adapted to receive pressure fluid intersecting the bore, and a bifurcated outlet chamber to discharge pressure fluid intersecting the bore on each side of the inlet chamber and with inlet chamber forming a pair of spaced control lands;
(b) a valve plunger slidable in the bore between two terminal positions, and having two spaced annular series of ports spaced from one another and an axial bore closed at its ends connecting the ports to one another to provide a flow path means lapping one of the control lands in each terminal position to open the valve to flow therethrough by connecting the inlet and outlet chambers;
(c) a cap connected to the valve body axially alined with the plunger bore;
(d) spring means disposed in the cap biasing the valve plunger to one of the treminal positions;
(e) detent means in the cap holding the valve plunger in its spring biased terminal position until a predetermined normal operating force is exerted on the plunger against the bias of the spring; and
(f) the valve plunger having a valve closed position, in response to normal operating force exerted thereon, intermediate the terminal positions wherein the spaced lands lap the ends of the flow path means to block flow from the inlet chamber to the outlet chamber.

No references cited.

M. CARY NELSON, *Primary Examiner.*